United States Patent [19]

Damico et al.

[11] Patent Number: 4,857,131

[45] Date of Patent: Aug. 15, 1989

[54] TWO-PART ADHESIVE FOR BONDING PLASTICS AND METALS

[75] Inventors: Dennis J. Damico; Kenneth W. Mushrush; Ruth M. Bennett, all of Erie, Pa.

[73] Assignee: Lord Corporation, Erie, Pa.

[21] Appl. No.: 125,852

[22] Filed: Nov. 27, 1987

[51] Int. Cl.$^4$ .................. C08F 279/02; C08L 63/00
[52] U.S. Cl. ...................... 156/331.4; 156/327; 156/330; 156/333; 156/334; 523/400; 523/427; 523/176; 525/109; 525/111; 525/112; 525/125; 525/126; 525/438; 525/440; 525/445; 525/455
[58] Field of Search ............ 525/245, 109, 112, 111, 525/125, 126, 455, 438, 440, 445, 132, 152, 391, 392, 534; 523/400, 427, 176; 156/331.1, 327, 330, 333, 334

[56] References Cited

U.S. PATENT DOCUMENTS 4,703,089 10/1987 Damico .............................. 525/245

*Primary Examiner*—C. Warren Ivy
*Attorney, Agent, or Firm*—Larson & Taylor

[57] ABSTRACT

A two-part, heat stable, peroxide-free adhesive that can be mixed in equal parts with rapid cure for the bonding of plastics and metals has been discussed. Part A of the adhesive contains a polymeric material, an olefinically unsaturated monomer, an acid material, a compound containing a sulfonyl halide group, and a compound containing a transition metal; and Part B contains a polymeric material (preferably a phenoxy resin) and monomer of the same class and a Zn, Cu or Cd metal powder.

12 Claims, 1 Drawing Sheet

TWO-PART ADHESIVE FOR BONDING PLASTICS AND METALS

This invention relates to two-part, heat stable adhesive formulations. More particularly, the invention relates to low-odor, two-part heat stable adhesive compositions for metals and plastics that can be mixed in equal parts.

Structural adhesives, such as structural acrylic adhesives, are well known articles of commerce which are extensively used commercially for bonding metal and plastic materials. Recently, acrylic structural adhesives have found growing use in the automotive industry where the adhesive bonding of metal and plastic components is replacing welding and mechanical fastening techniques. However, these applications give rise to unique requirements not easily met by previously available adhesives. These new requirements and associated problems have resulted in a need for new approaches in acrylic adhesive development designed for the specific application and conditions in which the adhesive will be employed. The production of joined parts often includes a paint curing cycle subsequent to the joining operation, which curing cycle occurs at temperatures of about 400° F. Where the parts are adhesively joined, the adhesive must be stable under paint curing conditions. Workers in the field of acrylic adhesives have struggled with the problem of formulating an adhesive which incorporates the known advantages of acrylic adhesives but includes improved heat stability. The acrylic adhesives typically comprise a mixture of one or more olefinic reactive monomers and curing agents, with cure or polymerization being effected through a free radical or ionic polymerization mechanism. The adhesives preferably contain one or more polymeric materials which may or may not be reactive, that is, capable of being polymerized per se or at least capable of interpolymerizing with the reactive monomers, such as grafting onto or crosslinking the growing polymers from the reactive monomer polymerization. In addition, the adhesives can contain other additives for improving adhesion to substrate materials, environmental resistance, impact strength, flexibility, heat resistance, and the like.

To achieve the desired adhesive performance, a number of approaches have been pursued Unfortunately, these approaches have critical limitations, particularly in actual production situations. One-part heat cured epoxies, for instance, are relatively slow curing and require temperatures in excess of 350° F. Induction heating has been useful in speeding up the production process but it is very expensive. Two-part epoxy systems will cure without sophisticated and expensive induction curing techniques but their curing time is slow. Anaerobic adhesives and cyanoacrylates tend to be expensive and cure only in minimal glue line thicknesses Moisture cure urethanes are very slow to cure and fail to cure altogether if large bond areas are involved Recently, it has been shown that both one-part and two-part acrylic adhesive compositions can be developed utilizing the metal surface to effect cure via the catalytic activity of that surface. This approach is fundamentally different than anaerobic adhesives which begin to cure via free radical mechanisms when oxygen is removed and also different than cyanoacrylates which cure ionically via reactions with "basic" species (e.g. water) on surfaces.

There have been many attempts to utilize the catalytic effect of metals in adhesive applications For example, it has been proposed to pretreat non-catalytic surfaces with a catalytic salt solution, such as the resinates of iron, copper or cobalt, see Lees U.S. Pat. No. 3,658,254, column 1, lines 29–52. The Lees patent itself is directed to two-package anaerobic acrylic adhesive compositions whose effectiveness was not influenced by the catalytic or non-catalytic character of the substrate. Skoultchi, in U.S. Pat. Nos. 3,880,956 and 3,957,561 discloses anaerobic acrylic adhesive compositions which are activated by contact with metal surfaces. The compositions of Skoultchi U.S. Pat. No. 3,880,956 are single-package anaerobic compositions containing diazonium salt catalysts which cure through a free radical polymerization mechanism when excluded from air or oxygen and in contact with certain metal surfaces such as iron, copper, tin, aluminum, silver, alloys of these metals and cadmium, chromium, nickel and zinc chromate platings. Skoultchi U.S. Pat. No. 3,957,561 discloses one-package anaerobic compositions utilizing a two-component catalyst system comprising at least one diazosulfone compound and o-sulfobenzimide which cure through a free radical polymerization mechanism when the adhesive is excluded from air or oxygen and in contact with active metal surfaces (the same surfaces described in Skoultchi '956). On the other hand, Skoultchi, in U.S. Pat. No. 4,052,244 utilized copper in the form of a copper salt of saccharin or p-toluenesulfonic acid to provide two-package anaerobic adhesives whose cure was otherwise not dependent on substrate composition. In another development, Skoultchi, in U.S. Pat. No. 4,081,308 discloses two-package anaerobic adhesives which utilize, in one package, copper saccharinate or saccharin in combination with a soluble copper salt, and, in the other package, an alpha-hydroxy sulfone, an alpha-aminosulfone or mixtures of such sulfones, as catalytic agents for the free radical curing of the anaerobic acrylic adhesive compositions. The cure of the Skoultchi U.S. Pat. No. 4,081,308 compositions is independent of substrate composition.

Despite the advantages of acrylic structural adhesives in the prior art, their success has been restrained due to one or more of the following drawbacks: inadequate heat stability, the presence of hazardous peroxides, slow cure and poor shear strengths. In addition, conventional two-part acrylic adhesive systems have a very strong objectional odor and cannot be mixed in equal parts without incurring loss in shear strength or ambient cure time. An equal mix two-part acrylic adhesive is extremely desirable in the simple expediency of application that such a system offers.

The present invention provides novel, essentially odorless, high heat stable, two-part acrylic adhesives for certain metal or plastics, which parts can be mixed together in equal proportions and cured at ambient temperature in the absence of peroxides and whether or not air or oxygen is excluded.

The invention utilizes in Part A of the two-part adhesive system, a combination of certain monomers, polymers and activators and in Part B of the adhesive system, polymers and monomers of the same class in combination with zinc, copper or cadmium powder. In particular, the two-part adhesive compositions of this invention comprise:

Part A (1) about 2 to 50%, preferably about 15 to 25%, based on the total weight of Part A, of a polymeric material selected from the group consisting of
  (a) at least one unsaturated urethane product of at least one isocyanate-functional prepolymer and at least one hydroxy-functional monomer having at least one unit of polymerizable olefinic unsaturation, such reaction product being characterized by the presence of at least two units of olefinic unsaturation and the substantial absence of free isocyanate groups;
  (b) at least one butadiene-based elastomeric polymeric material selected from the group consisting of
    (i) homopolymer of butadiene;
    (ii) copolymer of butadiene and at least one monomer copolymerizable therewith selected from the group consisting of styrene, acrylonitrile, methacrylonitrile and mixtures thereof;
    (iii) modified elastomeric polymeric material selected from the group consisting of butadiene homopolymer and copolymer as previously defined, such homopolymer and copolymer having been modified by copolymerization therein by trace amounts up to 5 percent by weight, based on weight of modified elastomeric material, of at least one functional monomer;
  (c) at least one phenoxy resin comprised of recurring units represented by the formula

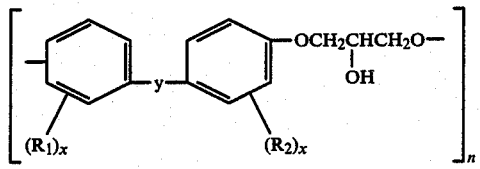

wherein y is selected from the group consisting of alkylene, oxygen, thio, sulfonyl and carboxyl; $R_1$ and $R_2$ are selected from the group consisting of hydrogen, halogen, alkyl, alkoxy, cycloalkyl, alkylenecycloalkyl, aryl; x is zero or an integer 1–4; n is 10 to 250; and
  (d) at least one polymer-in-monomer syrup consisting essentially of
    (i) from 10 to 98 percent by weight of at least one olefinically unsaturated monomeric compound having at least one

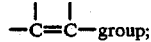

(ii) from 2 to 90 percent by weight of at least one polymer derived from such (d)(i) monomers;
    (iii) from zero to 30 percent by weight of at least one polymer containing the group $(CH_2-CCl=CHCH_2)_n$, wherein n is an integer; wherein (d)(ii) is present as a partial polymerization product of (d)(i) or of (d)(i) in the presence of (d)(iii); the mixture of (d)(i) and (d)(ii) or of (d)(i), (d)(ii) and (d)(iii) being a syrup of polymer dissolved or dispersed in unpolymerized monomer, in which syrup the amount of (d)(ii) derived from (d)(i) is in the range from 2 to 90 percent, based on the total weight of (d)(i), (d)(ii) and (d)(iii);
  (e) at least one polymeric material selected from the group consisting of polyvinyl alkyl ether, styreneacrylonitrile resin, unsaturated polyester resin and mixtures thereof, the alkyl moiety of such ether containing from 1 to 8 carbon atoms.
  (f) at least one homopolymer or copolymer of at least one olefinically unsaturated monomer selected from the group consisting of styrene and alkyl or hydroxyalkyl esters of acrylic and methacrylic acid, said ester having to 18 carbon atoms in the alkyl moiety; and
  (g) mixtures thereof; (2) about 20 to 80%, preferably about 55 to 70%, based on the total weight of Part A, of an olefin monomer or a Bronsted acid type olefinic monomer; (3) about 0.1 to 4%, preferably about 0.3 to 0.7%, based on the total weight of Part A, of at least one compound containing at least one sulfonyl halide group having the structure

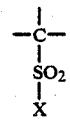

wherein X is selected from the group consisting of chlorine, bromine and iodine;
  (4) about 0.1 to 4%, preferably about 0.3 to 0.7%, based on the total weight of Part A, of at least one reducible organic or inorganic compound containing at least one transition metal, said metal having its valence elections in a "d" subshell, said metal selected from the elements of classes Ib, IIb, IIIb, IVb, Vb, VIb, VIIb, and VIII on the periodic chart of the elements;
  (5) about 0 to 8%, preferably about 3 to 5%, based on the total weight of Part A, of a Bronsted acid compound, with the proviso that said amount can be 0% when Part A(2) comprises a Bronsted acid olefinic monomer; and

Part B (1) about 2 to 50%, preferably about 15 to 25%, based on the total weight of Part B, of a Part A(1) polymeric material;
(2) about 20 to 80%, preferably about 55 to 70%, based on the total weight of Part B, of an olefin monomer or a Bronsted acid type olefinic monomer; and
(3) about 0.2 to 10%, preferably about 0.3 to 7%, based on the total weight of Part B, of a metallic powder selected from the group consisting of zinc, copper and cadmium metal powders; the proportions by weight of Part A to Part B being about 3:1 to 1:3.

Detailed Description of the Invention

Part A Components

Figure 1:
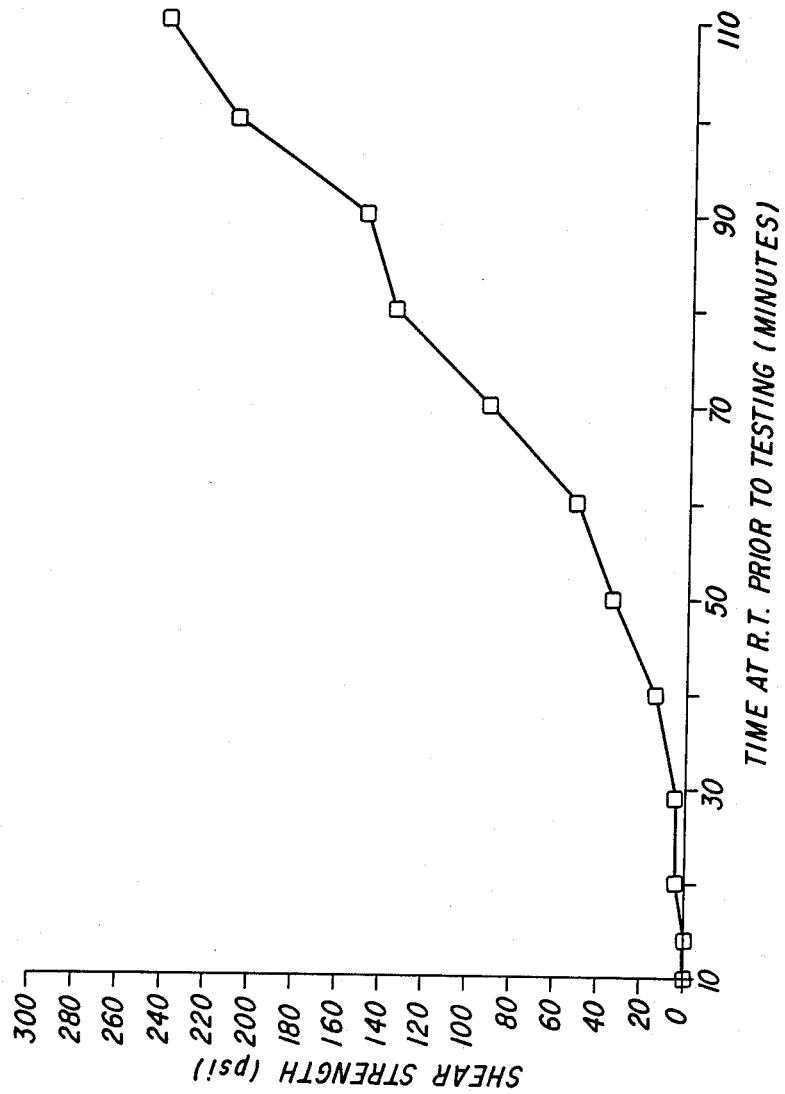

Polymeric materials comprising Part A(1)(a) through (f) of the adhesion composition of the invention will be further described below.

The isocyanate-functional prepolymers which are employed to form olefinically unsaturated urethane reaction products for use in the practice of the invention are well known. Typically, such prepolymers are adducts or condensation products of polyisocyanate compounds having at least 2 free isocyanate groups and monomeric or polymeric polyols having at least two hydroxy groups, including mixtures of such polyols. The reaction between the polyisocyanate and the polyols is effected employing an excess amount of polyisocyanate to ensure that the reaction product will contain at least 2 free, unreacted isocyanate groups.

Polyols useful in preparing isocyanate-functional prepolymer used in the present invention preferably have an average molecular weight of 300 to 3,000. Suitable polyols include polyalkylene glycols such as polyethylene glycols; poyetherpolyols such as those prepared by addition polymerization of ethylene oxide and a polyol such as trimethylol propane in a ratio to provide unreacted hydroxyl groups in the product; organic hydroxylated elastomers exhibiting second order glass transition temperatures below about 5° C. such as poly(-butadiene styrene) polyols and poly(butadiene) polyols; polyester polyols such as are prepared by polymerizing polyols, such as diethylene glycol, trimethylol propane or 1,4-butanediol, with polycarboxylic acids, such as phthalic, terephthalic, adipic, maleic or succinic acids, in a ratio to provide unreacted hydroxyl groups in the product; glyceride esters of hydroxylated fatty acids such as castor oil, glycerol monoricinoleate, blown linseed oil and blown soya oil; and polyesterpolyols such as are prepared by the polymerization of a lactone such as c-caprolactone.

Polyisocyanates which can be reacted with polyols to form isocyanate-functional prepolymers for use in the present invention can be any monomeric, that is nonpolymeric, isocyanate groups, including aliphatic, cycloaliphatic and aromatic compounds. Representative polyisocyanates include, without limitation thereto, 2,4-tolylene diisocyanate, 2,6-tolylene diisocyanate, 4,4'-diphenylmethane diisocyanate, m- and p-phenylene diisocyanate, polymethylene poly(phenyl isocyanate), hexamethylene diisocyanate, 4,4'-methylene-bis(cyclohexyl isocyanate), isophorone diisocyanate, and other aliphatic, cycloaliphatic and aromatic polyisocyanates, and including mixtures of such polyisocyanates. Currently, cycloaliphatic and aromatic polyisocyanates are preferred.

Hydroxy-functional compounds which can be employed to introduce olefinic unsaturation into the isocyanate functional prepolymer include, without limitation, hydroxyethyl acrylate, hydroxyethyl methacrylate, and allyl alcohol.

The butadiene-based elastomeric polymeric materials which are suitable for use in the practice of this invention are also well-known and can be any elastomer derived from 1,3-butadiene or its halogenated analogs which has a glass transition temperature below ambient temperature and preferably not above about 5° C. Suitable elastomers include butadiene homopolymer, copolymers of butadiene with styrene, acrylonitrile and methacrylonitrile, and such homopolymers and copolymers modified by copolymerization therein of trace amounts (0.05 to 5%) of a functional comonomer, such as acrylic acid, methacrylic acid, maleic anhydride, fumaric acid, styrene and methyl methacrylate.

Polymer-in-monomer syrups suitable for use in the present invention, compositionally as well as their preparation, are well-known in the art. Representative syrups, including precursor liquid monomer compounds containing at least one olefinically unsaturated group, and their preparation are disclosed in U.S. Pat. Nos. 3,333,025; 3,725,504; and 3,873,640. Briefly, such syrups are conveniently prepared by de-aerating the starting mixture consisting essentially of at least one polymerizable liquid olefinically unsaturated compound and, when used, polymer containing the group $(CH_2-CCl=CHCH_2)_n$, for a short period at about 40° C. under vacuum and then heating the mixture to about 75° C. under an inert gas atmosphere. A catalyst, for example, a free radical-generating catalyst such as benzoyl peroxide or azodiisobutyric acid dinitrile, is then added, preferably in the form of a solution. The quantity of catalyst added is such that it will be completely consumed when the desired viscosity is reached. After the reaction is completed, the polymer-in-monomer syrup is cooled. Preferably, the syrups have a viscosity in the range from about 500 to about 1,000,000 mPa's at 20° C.

Polymers containing the grouping $(CH_2-CCl=CHCH_2)_n$, wherein n is an integer, are well-known in the art under the name neoprene, which is produced by the polymerization of 2-chloro-1, 3-butadiene. Further elucidation would be superfluous.

Polyvinyl alkyl ethers suitable for use in the adhesive compositions which are described herein are well-known in the art. Such ethers will preferably contain one to 8, more preferably one to 4, carbon atoms in the alkyl moiety of said ether. Likewise, styrene-acrylonitrile polymers which are suitable for use in the invention are well-known.

Elastomeric polymeric materials having second order glass transition temperatures below about 5° C. can be effective in modifying room temperature flexibility of the adhesive bond. Especially preferred of such elastomers are polychloroprene rubber; polybutadiene rubber; butadiene copolymer rubbers such as acrylonitrilebutadiene, carboxylated acrylonitrile-butadiene and stryene-butadiene rubbers; polyacrylate rubbers such as poly(ethyl acrylate) and poly(ethyl acrylatehalogenate vinyl ether-acrylic acid) rubbers; and ethylene copolymers such as ethylene-vinyl acetate rubbers; and ethylene copolymers such as ethylene-vinyl acetate rubbers. Other elastomeric polymers having a glass transition temperature about 5° C. can be employed since, other than the low glass transion temperature, there are no other limitations on the identity of the elastomer except for the specific requirements of the particular adhesive being formulated, such as suitable molecular weight, viscosity characteristics and compatibility with the other ingredients of the adhesive.

Such elastomeric polymeric materials are particularly beneficial when incorporated in acrylic adhesives comprising at least one olefinically unsaturated polyurethane.

Polymeric materials having an intrinsic viscosity of 0.1 to about 1.3 which are suitable for use in the present invention can be obtained by the polymerization of 1 or more acrylic and nonacrylic monomers, including mixtures thereof. Exemplary polymeric materials include poly(methylmethacrylate/n-butylacrylate/ethylacrylate) (90/5/5%); poly(n-butyl methacrylate/isobutyl methacrylate) (50/50%); poly(n-butyl methacrylate) and poly(ethyl methacrylate). Preferably, the viscosity will be about midway in the recited range.

The use of polymeric materials having such intrinsic viscosities is especially beneficial in acrylic adhesives containing homopolymers and copolymers of 1,3-butadiene.

The phenoxy resins that may be employed in the present invention are prepared from the reaction of diphenols and epichlorohydrin using a strong base. Suitable diphenol monomers include all those derived from 4,4'-isopropylidenediphenol (bisphenol A). Alternatively, the phenoxy resins may be prepared by the polymerization of a diphenol and the diglycidylether of a diphenol The phenoxy resins and their preparation are well known in the art and further described in Encyclopedia of Polymer Science & Technology, Vol. 10, p. 111 (1969).

An exemplary phenoxy resin used in the specific example, described is PKHJ, a commercial product available through the Union Carbide Company and has the following chemical structure:

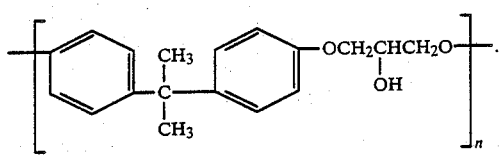

Phenoxy based resins are preferred components of both Parts A and B of the instant invention and provide the adhesive compositions described with excellent heat stability thereby expanding the applicability of acrylic single-package structural adhesives. In the preferred embodiment of the invention the polymeric material of Part A comprises a mixture of Part A(1)(b)(ii) and Part A(1)(c), preferably in proportions of 0 to 45% of the former to 30 to 60% of the latter, based on the total weight of the polymeric materials. Monomeric liquid olefinic compounds suitable for use in the adhesive compositions of the invention are characterized by the presence of at least one

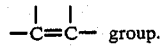

group.

The olefinic unsaturated group is preferably a vinyl group, with acrylic and substituted acrylic monomers being currently preferred. When olefinic monomers which do not contain acrylic or substitute acrylic groups are employed, they should be used in an amount not exceeding 50, preferably not more than 25, percent by weight, based upon the total weight of the part to which they are added. Representative olefinic monomers include, without limitation, furfuryl methacrylate, methyl methacrylate, butyl methacrylate, ethyl acrylate, diethylene glycol dimethacrylate, methacrylic acid, acrylic acid, acrylonitrile, methacrylonitrile, styrene, vinyl acetate, chlorostyrene, glycidyl methacrylate, itaconic acid, acrylamide, methcrylamide, vinylidene chloride, 2,3-dichloro-1,3-butadiene, 2-chloro-1,3-butadiene, methylstryrene and n-butylstyrene, with a furfuryl methacrylate such as tetrahydrofurfuryl methacrylate being preferred.

The acidic compounds of the invention can include substantially any organic or inorganic acid having at least one acid group, and includes organic partial esters of such acids. The acidic compounds are in the nature of Bronsted acids, that is, compounds which can donate a proton. Suitable acidic compounds preferably have a pKa in the range from 0.5 to 6, most preferably in the range from 1.5 to 5. The acidic compounds should also be reasonably soluble in the adhesive compositions of the invention to facilitate homogeneous distribution of the acid throughout the composition. The selection of the acidic component is a function of the substrate to be bonded, as well as the desired adhesive performance, and provides the adhesive chemist considerable latitude in formulating adhesive compositions specifically designed for any particular end use. For example, organic acids, as well as organic partial esters of such acids are preferred for bonding ferrous metals and their alloys, but adhesives containing such organic acids can be prepared according to the invention which are effective bonding agents for non-ferrous metals, such as galvanized steel. Conversely, the inorganic acids, and the organic partial esters of such acids, are preferred for bonding non-ferrous metals and their alloys[but adhesives containing such inorganic acids can also be prepared which are useful for bonding ferrous metals and their alloys. In the general case, acidic compounds which contain both at least one acid group and at least one olefinically-unsaturated moiety are preferred.

Representative acidic compounds which are suitable for use in the practice of the invention include phosphoric acid, 2-hydroxyethyl methacrylate partial ester of phosphoric acid, 2-hydroxyethyl acrylate partial ester of phosphoric acid, phosphoric acid, benzenephosphonic acid, phosphorous acid, sulfuric acid, sulfurous acid, 2-ethylhexanoic acid, formic acid, acetic acid, butyric acid, hexanoic acid, naphthenic acid, lauric acid, linoleic acid, valeric acid, toluene sulfonic acid, nitrotoluene sulfonic acid, dichloroacetic acid, trichloroacetic acid, acetoacetic acid, acrylic acid, methacrylic acid, aminobenzosulfonic acid, maleic acid, malonic acid, phthalic acid, suberiq acid, succinic acid and vinyl acetic acid.

The inorganic acids and organic partial esters of inorganic acids are currently preferred for use with thermoplastics and non-ferrous metals such as zinc, copper, cadmium, their alloys and platings, with olefinic partial esters of inorganic acids bring currently preferred. Adhesive compositions prepared in accordance with this invention which contain such inorganic acids typically provide better adhesion when bonding non-ferrous metals than is obtained from the use of organic acids. Adhesive compositions containing the inorganic acids provide lower adhesion values with ferrous metal surfaces than is obtained from the use of organic acids; however, the inorganic acid-containing adhesives are sufficiently effective in bonding ferrous metals that they can be utilized in applications such as thread-locking of iron bolts and nuts.

In the general case, it has been noted that stronger acids, as well as larger quantities of any acid, tend to increased the rate at which the adhesive compositions 1 cure. The use of strong acids, e.g., those having $pK_a$ values of 1 or less, particularly in large amounts, can lead to corrosion problems and tends to deactivate the adhesives, possibly through chelate formation. The use of large amounts of any given acid also tends to give lower adhesion values; but it has been observed that such reductions in adhesion values is not as great when the acidic compound contains one or more polymerizable olefinically unsaturated groups. Thus some degree of experimentation may be required in selecting the acid and the amount of the acid, in order to achieve an acceptable compromise of properties. In those cases where the acid does not contain polymerizable moities, the amount of the acid is preferably in the range from 0.05 to 5%, based on the total weight of Part A.

The sulfonyl halide-containing compounds are also essential to the practice of this invention. As noted, the halide moiety can be chlorine, bromine or iodine with the sulfonyl chlorides being currently preferred. The sulfonyl halides can be mono- or poly-functional and can be aliphatic sulfonyl halides having from one to 12 or more carbon atoms, aromatic sulfonyl halides having from 1 to 3 aromatic nuclei and containing from 6 to 24 carbon atoms. Representative sulfonyl halide containing compounds include biphenyl disulfonyl chloride, trichlorobenzene sulfonyl chloride, p-toluene sulfonyl chloride, benzene sulfonyl chloride, hexadecane sulfonyl chloride, diphenyl ether-4,4'-sulfonyl chloride, and the corresponding sulfonyl bromides and iodides. Monomeric sulfonyl halides are currently preferred, with the aromatic sulfonyl halides, particularly p-toluene sulfonyl chloride, being especially preferred.

Equally as essential as are the compounds containing at least one sulfonyl group and the acidic compounds, both supra, are compounds containing at least one transition metal. As used herein, transition metals are those metals which have their valence electrons in a "d" sub-shell. Such metals are found in Classes Ib–VII b and VIII on the periodic chart of elements. The preferred metals are copper, zinc, cobalt, vanadium, iron and manganese. The metal should be in a higher oxidation state, with the highest oxidation state being preferred in all cases. Inorganic compounds containing the transition metals can be used, such as the metal salts exemplified by the bromides, chlorides, phosphates, sulfates, sulfides and oxides of the transition metals. Likewise, organic compounds containing the transition metals can be used, such as transition metal salts of organic mono- and poly-carboxylic acids and mono- and poly-hydroxy compounds, such as cupric acetate, cupric maleate, cupric hexoate, iron naphthenate, cobaltous and cobaltic naphthenate and the like. Particularly preferred organic derivatives are sulfimide and sulfoamide compounds which contain the transition metal, such as the currently preferred cupric sacchrinate. This is but a partial listing of suitable inorganic and inorganic salts; however, other useful salts will be readily obvious to those skilled in the art.

The transition metal-containing organic compounds are typically more soluble in the adhesive compositions of this invention, and they are preferred compounds. It is important that the transition metal compound, be it organic or inorganic, have some degree of solubility, either in the adhesive composition itself or in an inert solvent which is preferably compatible with the adhesive compositions. Because of the limited solubility of at least some usable transition metal compounds, it can be advantageous to dissolve the compound in the adhesive or inert solvent and filter off the undissolved material.

Part B Components

Part B comprises any of the polymeric materials identified above under Part A(1)(a) through (f), a Bronsted acid type olefinic monomer identified above under Part A(2) and a metal powder selected from zinc, copper and cadmium metal powders. The preferred polymeric materials are the phenoxy resins identified above under Part A(1)(c), the preferred Bronsted acid type monomer is a furfuryl methacrylate and the preferred metal powder is zinc.

Either or both Part A or Part B of the two-part adhesives of the invention may optionally contain a variety of inorganics functioning as fillers and modifiers as may be preferred in a specific application. For example, fumed silica or talc, or mixtures thereof may be added to either Part A or Part B of the composition or to both to thicken the composition for handling and ease of application purposes. The preferred thickener is fumed silica, preferably in an amount of about 0.5 to 4%, based on the part to which it is added. Further, the adhesive compositions may include stabilizers, such as anti-oxidants, to improve the shelf-life of the adhesive as packaged in an amount sufficient to inhibit degradation of the adhesive composition. Any of the stabilizers known to improve shelf life of acrylic adhesive compositions such as benzoquinone or t-butyl catechol can be used. When employed, the stabilizers are provided in one or both parts of the two-part compositions in concentrations ranging from 0.001 to 0.1%, based on the total weight of the part to which it is added.

Part B of the composition also may optionally contain 1 to 30% $TiO_2$ based on the total weight of Part B. The presence of $TiO_2$ has been found to further improve the heat stability of the adhesive composition of the invention.

The adhesive compositions of the invention are readily prepared by first combining the respective ingredients to form Part A and Part B. Part A and Part B are then mixed using any conventional device just prior to use. The resulting adhesive mixture may be brushed, rolled, sprayed, dotted, knifed or otherwise applied to one substrate, but preferably to both substrates in a thickness not to exceed 60 mils. The substrates may be clamped for firmness during cure in those installations where relative movement of the two substrates might be expected. For example, to adhere metal or plastic surfaces, an adherent quantity of the adhesive composition is applied to one surface, preferably to both surfaces, and the surfaces are confronted with the adhesive composition therebetween. The adhesive should have a thickness less than 60 mils for optimum results. The smoothness of the surfaces and their clearance (e.g., in the case of nuts and bolts) will determine the required film thickness for optimum bonding. The metal surfaces and the interposed adhesive composition are maintained in engagement until the said adhesive composition has cured sufficiently to bond said surfaces.

The two-part adhesive composition of the invention may be employed to bond metal surfaces together and exhibits good bonding properties with steel, galvanized steel, and aluminum. The adhesives also exhibit excellent bonding properties to thermoplastics such as ABS plastics, polycarbonates, Plexiglass and the like. With few exceptions, the adhesive compositions of the invention exhibit good environmental resistance. Adhesive compositions prepared according to this invention are useful as a thread lock material to one applied to the threads of a threaded fastener to form a tight bond between the fastener and its threaded receiving member, e.g., a bolt and nut. The use of structural adhesives avoids the need for unsightly weld marks, exposed threaded fasteners, exposed rivets, etc. Structural adhesives may be substituted in part for other mechanical fasteners, for example, in the transportation industry where exterior panels are secured to frame members or to other panel members by means of exposed fasteners, such as rivets, threaded fasteners, welding, etc. A number of the welds, rivets or threaded fasteners can be eliminated and their function can be performed by appropriate reliable structural adhesives in accordance with the present invention.

The following examples illustrate the composition and advantages of adhesives of the instant invention in a series of comparative tests. In the examples, the determination of the comparative efficacy of the various adhesive formulations is made through shear strength tests on specimens cured at room temperature, a low bake cure (350° F) and an abuse bake cure (400° F.). The shear strength test was a lap shear test employed in accordance with ASTM 1002-79. Except where otherwise indicated, all test coupons were prepared by solvent wiping The bonding area was a one inch overlap of two strips with an adhesive thickness of 0.005 inch. Shear strengths were measured 24 hours after application.

EXAMPLE I

A two-part adhesive composition was obtained by separately blending in a conventional manner the components identified under A and B in the following Table I:

TABLE I

|  | A | B |
|---|---|---|
| 25% Hycar 1072 in THFMA | 369 | — |
| 25% PKHJ in THFMA | 428 | 752 |
| Copper saccharinate | 6 | — |
| p-toluene sulfonyl chloride | 7 | — |
| Benzoquinone | 0.2 | 0.2 |
| Hema phosphate methacrylate | 42 | — |
| Talc | 124 | — |
| Fumed silica | 25 | 22 |
| Powdered zinc | — | 6 |
| $TiO_2$ | — | 220 |
| Viscosity | 154,000 cps | 176,000 cps |
| Lbs./Gal. | 9.15 | 10.53 |

Hycar 1072 = carboxylated (poly 1,3-butadiene/acrylonitrile)
THFA = tetrahydrofurfurylmethacrylate
PKHJ = phenoxy resin

EXAMPLE II

Part A and Part B in the formation identified in Table I were mixed together in equal parts in a conventional manner. The resulting mixture has essentially odorless. The bond strength and cure rate of the resulting adhesive was studied and the results of the study are reported in FIG. 1. Full cure of he adhesive mixture took 8–10 hours.

EXAMPLE III The bond properties of the equal adhesive mix of Example II to metals and plastics were studied. The results are shown in Table 11 below.

TABLE II

| Bond Properties of the Equal Mix Acrylic | | | |
|---|---|---|---|
| | Metals | | |
| | CO1010 CRS | G-90 | 6061-T6 Aluminum |
| | 2830 80 COH/20 ADH | 1730 100 ADH | 2356 75 TFC/25 ADH |
| | 2694 80 COH/20 ADH | 2262 100 ADH | 2588 75 TFC/25 ADH |
| | 2728 70 COH/30 ADH | 2048 100 ADH | 2604 75 TFC/25 ADH |
| x | 2751 psi | 2013 psi | 2516 psi |
| a/x | 2.6% | 13.3% | 5.5% |
| | Plastics | | |
| | Xenoy 1102A | Plexiglas | Lexan LS2 |
| | 823 SB | 199 SB | 658 SB |
| | 808 Stretched | 303 SB | 538 SB |
| | 847 SB | 400 SB | 675 COH/SB |
| x | 826 psi | 301 psi | 624 psi |
| a/x | 2.4% | 33.4% | 12.0% |

Bondline for Metals
1.0"×0.5"×0.010"
All surfaces were solvent wiped.
Bondline for Plastics
1.0"×1.0"×0.010"
All surfaces were dry rag wiped.

All were room temperature cured only for 16 hours prior to testing.

As can be seen from the results of Table II, the two-part equal adhesive mix of the invention exhibits excellent bonding to metals and plastics.

EXAMPLE IV

The environmental resistance of the two-part adhesive mix of Example II was compared to Versilok 204, a commercial adhesive for metals or plastics for retention on CQ1010 CRS, ABS, 6-90 and 6061-$T_6$ aluminum. The environmental testing included, (1) H0 soak at 130° F., (2) salt spray test, (3) heat aging at 158° F. and (4) 100% relative humidity at 100° F., all for seven days. The results of the tests showed the equal adhesive mix of the invention gave comparable results in all cases except with aluminum.

It is claimed:

1. A two-part pack for providing on mixing of the two parts a heat stable adhesive composition curable at ambient temperature, said two part pack comprising:
Part A comprising:
  (1) about 2 to 50%, based on the total weight of Part A of a polymeric material selected from the group consisting of
    (a) at least one unsaturated urethane product of at least one isocyanate-functional prepolymer and at least one hydroxy-functional monomer having at least one unit of polymerizable olefinic unsaturation, such reaction product being characterized by the presence of at least two units of olefinic unsaturation and the substantial absence of free isocyanate groups;
    (b) at least one butadiene-based elastomeric polymeric material selected from the group consisting of
      (i) homopolymer of butadiene;
      (ii) copolymer of butadiene and at least one monomer copolymerizable therewith selected from the group consisting of styrene, acrylontrile, methacrylontrile and mixtures thereof;
      (iii) modified elastomeric polymeric material selected from the group consisting of butadiene homopolymer and copolymer as previously defined, such homopolymer and copolymer having been modified by copolymerization therein by trace amounts up to 5 percent by weight, based on weight of modified elastomeric material, of at least one functional monomer;

(c) at least one phenoxy resin comprised of recurring units represented by the formula

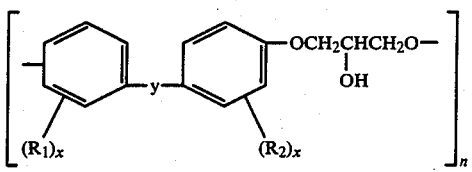

wherein y is selected from the group consisting of alkylene, oxygen, thio, sulfonyl and carboxyl; $R_1$ and $R_2$ are selected from the group consisting of hydrogen, halogen, alkyl, alkoxy, cycloalkyl, alkylenecycloalkyl, aryl; x is zero or an integer 1-4; n is 10 to 250; and (d) at least one polymer-in-monomer syrup consisting essentially of
   (i) from 2 to 90 percent by weight of at least one polymer derived from at least one olefinically unsaturated monomer;
   (ii) from zero to 30 percent by weight of at least one polymer containing the group ($CH_2$—C-CL=$CHCH_2$)n, wherein n is an integer;
   wherein (d) (i) is present as a partial polymerization product of said olefinically unsaturated monomer or of said olefinically unsaturated monomer in the presence of (d) (ii); the mixture of said olefinically unsaturated monomer and (d) (i) or (d) (ii) and (d) (iii) being a syrup of polymer dissolved or dispersed in unpolymerized monomer, in which syrup the amount of (d) (i) derived from said olefinically unsaturated monomer is in the range from 2 to 90 percent, based on the total weight of (d) (i) and (d) (ii);

(e) at least one polymeric material selected from the group consisting of polyvinyl alkyl ether, styrene-acrylonitrile resin, unsaturated polyester resin and mixtures thereof, the alkyl moiety of such ether containing from 1 to 8 carbon atoms;

(f) at least one homopolymer or copolymer of at least one olefinically unsaturated monomer selected from the group consisting of styrene and alkyl or hydroxyalkyl esters of acrylic and methacrylic acid, said ester having 1 to 18 carbon atoms in the alkyl moiety and (g) mixtures thereof;

(2) about 20 to 80%, based on the total weight of Part A, of an olefin monomer;

(3) about 0.1 to 4%, based on the total weight of Part A, of at least one compound containing at least one sulfonyl halide group having the structure

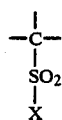

wherein X is selected from the group consisting of chlorine, bromine and iodine;

(4) about 0.1 to 4%, based on the total weight of Part A, of at least one reducible organic or inorganic compound containing at least one transition metal, said metal having its valence elections in a "d" subshell, said metal selected from the elements of classes Ib, IIb, IIIb, IVb, Vb, VIb, VIIb, and VIII on the periodic chart of the element; and Part B comprising:

(1) about 2 to 50%, based on the total weight of Part B, of at least one phenoxy resin;

(2) about 20 to 80%, based on the total weight of Part B, of an olefin monomer; and (3) about 0.2 to 8%, based on the total weight of Part B, of a metallic powder selected from the group consisting of zinc, copper and cadmium metal powders; the proportions by weight of Part A to Part B being about 3:1 to 1:3.

2. An adhesive composition according to claim 1 wherein said phenoxy resin is the polymerization product of Bisphenol A and epichlorohydrin.

3. An adhesive composition according to claim 2 wherein the phenoxy resin is the polymerization product of Bisphenol A and the diglycidyl ether of Bisphenol A.

4. An adhesive composition according to claim 1 wherein the polymeric component of Part A(l) comprises at least one of a butadiene-based elastomeric material selected from the group consisting of the polymeric material identified as Part A(1)(b).

5. An adhesive composition according to claim 4 wherein the polymeric material selected is Part A(1)(b)(ii).

6. An adhesive composition according to claim 4 wherein said phenoxy resin is the polymerization product of Bisphenol A and epichlorohydrin.

7. An adhesive composition according to claim 4 wherein said phenoxy resin is the polymerization product of Bisphenol A and the diglycidyl ether of Bisphenol A.

8. An adhesive composition according to claim 4 wherein the polymeric component of Part A(1) comprises at least one of a butadiene-based elastomeric material selected from the group consisting of the polymeric material identified as Part A(1)(b).

9. An adhesive composition according to claim 1 wherein the metallic powder is powdered zinc.

10. An adhesive composition according to claim 1 wherein the reducible metal compound is copper sacchrinate.

11. A two-part, heat stable adhesive composition curable at ambient temperature comprised of Part A comprising:

(1) about 2 to 50%, based on the total weight of Part A, of a mixture of:
   (a) at least one butadiene-based elastomeric polymeric material selected from the group consisting of
      (i) homopolymer of butadiene;
      (ii) copolymer of butadiene and at least one monomer copolymerizable therewith selected from the group consisting of styrene, acrylonitrile, methacrylonitrile and mixtures thereof; and
   (b) a phenoxy resin comprised of recurring units represented by the formula

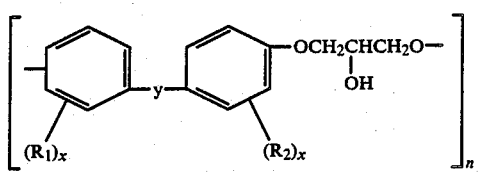

wherein y is selected from the group consisting of alkylene, oxygen, thio, sulfonyl and carboxyl; $R_1$ and $R_2$ are selected from the group consisting of hydrogen, halogen, alkyl, alkoxy, cycloalkyl, alkylenecycloalkyl, aryl; x is zero or an integer 1–4; n is 10 to 250;

(2) about 20 to 80%, based on the total weight of Part A, of methacrylate monomer;

(3) about 0.1 to 4%, based on the total weight of Part A, of p-toluene sulfonyl chloride;

(4) about 0.1 to 4%, based on the total weight of Part A, of copper saccharinate;

(5) about 0.5 to 4%, based on the total weight of Part A, of fumed silica; and Part B comprising:

(1) about 2 to 50%, based on the total weight of Part B, of a phenoxy resin comprised of recurring units represented by the formula

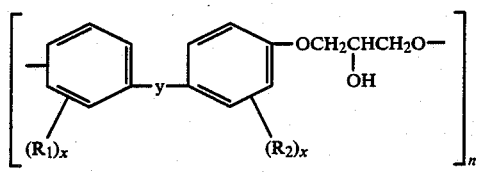

wherein y is selected from the group consisting of alkylene, oxygen, thio, sulfonyl and carboxyl; $R_1$ and $R_2$ are selected from the group consisting of hydrogen, halogen, alkyl, alkoxy, cycloalkyl, alkylenecycloalkyl, aryl; x is zero or an integer 1–4; n is 10 to 250;

(2) about 0.2 to 8%, based on the total weight of Part B, of a powdered metal zinc;

(3) about 1 to 30%, based on the total weight of Part B, of $TiO_2$; and (4) about 0.5 to 4%, based on the total weight of Part B, of fumed silica; the proportions by weight of Part A to Part B being about 3:1 to 1:3.

12. A method of adhering two metal or plastic surfaces one to the other comprising mixing together Part A and Part B of claim 1 in proportions by weight of Part A to Part B of about 3:1 to 1:3, applying the resulting adhesive mixture to at least one of said surfaces, engaging the said two surfaces with said adhesive mixture therebetween, maintaining the metal surfaces and interposed adhesive composition in engagement until the adhesive material has cured sufficiently to bond said surfaces.

* * * * *